J. H. JONES.
Harvester Rake.

No. 49,530.            Patented Aug. 22, 1865.

WITNESSES

INVENTOR

UNITED STATES PATENT OFFICE.

J. HERVA JONES, OF ROCKTON, ILLINOIS.

IMPROVEMENT IN HARVESTER-RAKES.

Specification forming part of Letters Patent No. 49,530, dated August 22, 1865.

*To all whom it may concern:*

Be it known that I, J. HERVA JONES, of Rockton, in the county of Winnebago and State of Illinois, have invented a new and useful Improvement in Automatic Rakes for Harvesters, of which the following is a full, clear, and exact description, reference being had to the accompanying drawings, which make part of this specification, and in which—

Figure 1:
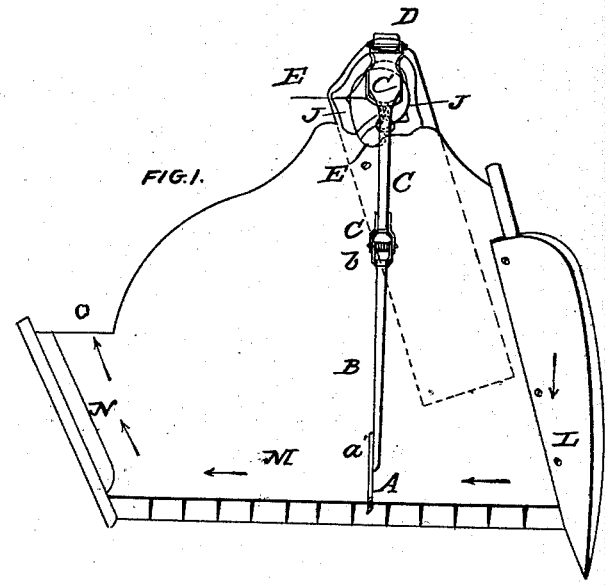
Figure 2:
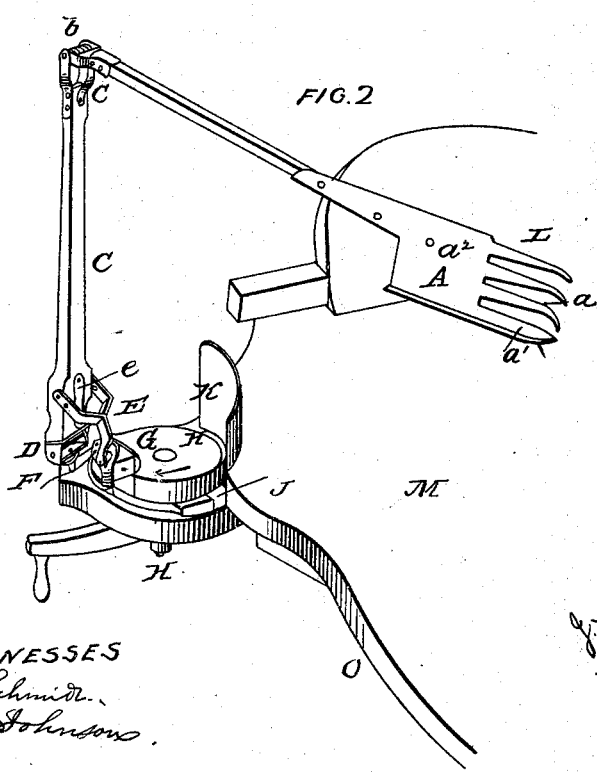

Figure 1 represents a plan view of so much of a harvester to which my improvement is applied as is necessary to illustrate my invention; and Fig. 2, a view in perspective of my improved rake.

It is the object of my invention automatically to discharge cut grain in gavels suitable for binding from the platform of a harvester and to deposit it upon the ground behind the driving-wheel and out of the path of the horses in cutting the succeeding swath; and to this end the improvement herein claimed consists in mounting a jointed rake-stale on a turning post and connecting it with a crank-pin moving in a slot, substantially in the manner hereinafter described, so that the figure described by the slot is reproduced on a larger scale by the rake.

In the accompanying drawings my improvement is shown as adapted to discharge the grain from the platform of what is known as the "John H. Manny harvester." In this instance the rake-head A is shown as mounted on an arm, B, pivoted to another arm, C, in such manner as to allow both to play freely in a vertical plane parallel to their length. The rake-head may have prongs $a$ instead of being solid. The bottom prong I form with a horizontal ledge or flange, $a'$, projecting on the side toward which the rake moves, having found such flange very useful in sliding under and catching up grain and preventing overriding. A spring, $b$, in this instance a spiral one coiled around the joint-pin connecting the two arms, serves to keep the rake down upon the platform, while a stop, $c$, prevents the two arms from approaching too closely when the arms are vertical. The lower end of the arm C is pivoted to the platform by a universal joint, D, which allows it to have an axial as well as an oscillating movement in its socket. A pivoted link or pitman, E, connects the rocking-arm C with a swiveling wrist-pin on a link, F, pivoted to a crank-arm, G, rotating on a shaft, H, driven in any suitable manner. By this arrangement the wrist-pin freely can vary its distance from the shaft H, around which it revolves with a planetary motion. The wrist-pin may move in a radial slot in the crank-arm instead of being attached to the link F, if preferred, but its operation in either case would be the same. A spring, $e$, in the arm C presses against the link E to aid it in passing the dead-point of its rotation. A friction-roller, I, on the lower end of this wrist-pin traverses in a stationary cam-groove, J, of a contour corresponding with the path desired to be traversed by the rake, but on a smaller scale. A shield or fence, K, prevents the grain from becoming entangled in the gearing.

I will now describe the operation of the machine, which, as before remarked, is in this instance designed to imitate the mode of discharge by hand practiced on the John H. Manny machine. In Fig. 2 of the drawings the rake is shown as lifted above the platform, and as in the act of turning to begin a new stroke, the rotation of the crank-shaft H being in the direction indicated by the arrow in that figure. The rotation of this shaft causes the friction-roller I to travel in the cam-groove J, carrying the link E with it and turning the rake until it is parallel with the divider L, along which it descends and slides until it reaches the front of the platform M, across which it moves, compressing the gavel against a wing-board or fence, N. The roller having now begun to move backward in the cam, the rake is contracted, drawing the grain back endwise and discharging it from the platform at the point O. The rake then rises, turns, descends, and repeats the movements above described.

It will be observed that my rake has no connection with the platform; that it is lifted high above it, except when actually raking off, and that in turning it passes entirely over the grain falling thereon, thus avoiding all danger of becoming entangled with the falling grain as it is swept back by the reel.

It is obvious that the location, construction, and arrangement of my rake may be varied in many ways without departing from the spirit of my invention. For instance, I have shown the rake as mounted in the rear of the platform, but it might be arranged to work from either the grain or the gearing side, and to discharge at either side. The joint has been shown as working vertically, but it might be arranged to work horizontally with good effect. The link E, instead of being connected to the arm C, might be made long enough to be attached to the bar B, and would still produce the same motion with a slight modification of the mechanism. The rake-head might also be pivoted to play vertically on a pivot, $a^2$, so as always to remain parallel with the platform and be held down upon it by a spring. These and other modifications would readily suggest themselves to a skillful mechanic on seeing my invention.

My invention consists in causing the rake to traverse in a path the counterpart on a larger scale of that traversed by the guide-roller, on the principle of a pantograph. It is therefore evident that by varying the form of the cam-groove the discharge could be made circularly, diagonally, or in any path desired.

What I claim as my invention, and desire to secure by Letters Patent, is—

1. The combination of the jointed rake-stale, the link-rod or pitman, and the cam-guide, substantially in the manner described, for the purpose of causing the rake to traverse in a path the counterpart of the cam-groove, as set forth.

2. The stop $c$, arranged and operating substantially as described.

3. The combination, with the arms B C, of a spring, $b$, substantially as and for the purpose described.

In testimony whereof I have hereunto subscribed my name.

J. HERVA JONES.

Witnesses:
J. G. MANLOVE,
BYRON L. GRAHAM.